US007960638B2

(12) United States Patent
Miyajima et al.

(10) Patent No.: US 7,960,638 B2

(45) Date of Patent: Jun. 14, 2011

(54) APPARATUS AND METHOD OF CREATING CONTENT

(75) Inventors: Yasushi Miyajima, Kanagawa (JP); Kosei Yamashita, Kanagawa (JP); Motoyuki Takai, Tokyo (JP); Yoichiro Sako, Tokyo (JP); Toshiro Terauchi, Tokyo (JP); Toru Sasaki, Tokyo (JP); Yuichi Sakai, Kanagawa (JP)

(73) Assignee: Sony Corporation, Tokyo (JP)

( * ) Notice: Subject to any disclaimer, the term of this patent is extended or adjusted under 35 U.S.C. 154(b) by 755 days.

(21) Appl. No.: 11/661,040

(22) PCT Filed: Aug. 25, 2005

(86) PCT No.: PCT/JP2005/015418

§ 371 (c)(1), (2), (4) Date: Mar. 20, 2008

(87) PCT Pub. No.: WO2006/030612

PCT Pub. Date: Mar. 23, 2006

(65) Prior Publication Data

US 2008/0288095 A1 Nov. 20, 2008

(30) Foreign Application Priority Data

Sep. 16, 2004 (JP) ................................ 2004-269086

(51) Int. Cl.
*G10H 1/00* (2006.01)

(52) U.S. Cl. ................. 84/604; 84/600; 84/605; 84/606

(58) Field of Classification Search ............ 84/600–602, 84/604–606

See application file for complete search history.

(56) References Cited

U.S. PATENT DOCUMENTS

| | | | | |
|---|---|---|---|---|
| 4,399,731 | A * | 8/1983 | Aoki | 84/609 |
| 4,982,643 | A * | 1/1991 | Minamitaka | 84/613 |
| 5,099,740 | A * | 3/1992 | Minamitaka | 84/651 |
| 5,451,709 | A * | 9/1995 | Minamitaka | 84/609 |
| 5,627,335 | A * | 5/1997 | Rigopulos et al. | 84/635 |
| 5,736,663 | A * | 4/1998 | Aoki et al. | 84/609 |
| 5,763,804 | A * | 6/1998 | Rigopulos et al. | 84/635 |
| 5,990,407 | A * | 11/1999 | Gannon | 84/613 |
| 6,084,169 | A * | 7/2000 | Hasegawa et al. | 84/600 |
| 6,143,971 | A * | 11/2000 | Aoki et al. | 84/609 |
| 6,162,982 | A * | 12/2000 | Aoki | 84/611 |
| 6,245,984 | B1 * | 6/2001 | Aoki et al. | 84/611 |
| 6,252,152 | B1 * | 6/2001 | Aoki et al. | 84/609 |

(Continued)

FOREIGN PATENT DOCUMENTS

JP 03-013993 1/1991

(Continued)

*Primary Examiner* — David S. Warren

(74) *Attorney, Agent, or Firm* — Wolf, Greenfield & Sacks, P.C.

(57) ABSTRACT

Audio content data is used in various modes as materials to easily create a new high-quality audio content. Multiple pieces of audio content data used as material data are prepared in advance in a material data storage device 31. Additional data is added to each piece of the material data and is stored in a material database storage device 32. A controlling unit 10 extracts necessary material data from the material data storage device 31 on the basis of at least one of external information received by a receiving unit 20 and rule information stored in a restructuring rule database storage device 33 in accordance with the additional data to compose a new music piece from the extracted material data.

28 Claims, 8 Drawing Sheets

U.S. PATENT DOCUMENTS 6,403,870 B2 * 6/2002 Aoki ........ 84/609
6,472,591 B2 * 10/2002 Aoki et al. ........ 84/611
6,541,691 B2 * 4/2003 Tolonen et al. ........ 84/616
6,576,828 B2 * 6/2003 Aoki et al. ........ 84/635
6,791,021 B2 * 9/2004 Aoki ........ 84/613
6,822,153 B2 * 11/2004 Comair et al. ........ 84/609
6,938,209 B2 * 8/2005 Ogawa et al. ........ 715/727
6,984,781 B2 * 1/2006 Mazzoni ........ 84/613
7,053,291 B1 * 5/2006 Villa ........ 84/609
7,119,268 B2 * 10/2006 Futamase et al. ........ 84/622
7,130,860 B2 * 10/2006 Pachet et al. ........ 707/769
7,342,166 B2 * 3/2008 Kay ........ 84/609
RE40,543 E * 10/2008 Aoki et al. ........ 84/609
7,514,624 B2 * 4/2009 Futamase et al. ........ 84/622
7,655,855 B2 * 2/2010 Georges et al. ........ 84/609
2001/0047717 A1 * 12/2001 Aoki et al. ........ 84/611
2002/0007720 A1 * 1/2002 Aoki et al. ........ 84/609
2002/0007722 A1 * 1/2002 Aoki et al. ........ 84/635
2002/0011145 A1 * 1/2002 Aoki ........ 84/609
2002/0029685 A1 * 3/2002 Aoki ........ 84/613
2002/0035915 A1 * 3/2002 Tolonen et al. ........ 84/616
2002/0083055 A1 * 6/2002 Pachet et al. ........ 707/5
2002/0134221 A1 * 9/2002 Georges ........ 84/609
2003/0200859 A1 * 10/2003 Futamase et al. ........ 84/622
2003/0205125 A1 * 11/2003 Futamase et al. ........ 84/622
2004/0007120 A1 * 1/2004 Futamase et al. ........ 84/622
2004/0074377 A1 * 4/2004 Georges ........ 84/609
2004/0159213 A1 * 8/2004 Eruera ........ 84/609
2007/0113725 A1 * 5/2007 Oliver et al. ........ 84/612
2007/0113726 A1 * 5/2007 Oliver et al. ........ 84/615
2007/0137463 A1 * 6/2007 Lumsden ........ 84/603
2007/0227338 A1 * 10/2007 Georges ........ 84/602
2008/0288095 A1 * 11/2008 Miyajima et al. ........ 700/94
2009/0071315 A1 * 3/2009 Fortuna ........ 84/609
2009/0241760 A1 * 10/2009 Georges ........ 84/645
2010/0050854 A1 * 3/2010 Huet et al. ........ 84/611
2010/0088701 A1 * 4/2010 Greiner et al. ........ 718/100
2010/0175539 A1 * 7/2010 Silbert et al. ........ 84/612

FOREIGN PATENT DOCUMENTS

JP 05-204387 8/1993
JP 08-227297 9/1996
JP 08-248953 9/1996
JP 2002-117069 4/2002
JP 2002-247697 8/2002
JP 2004-086189 3/2004

* cited by examiner

PLAYBACK OF CONTENT
PLAYBACK APPARATUS
RESTRUCTURING RULE DATABASE
2
RESTRUCTURING ALGORITHM
3
MATERIAL DATA
1
RECEIVING UNIT
4
ENVIRONMENTAL INFORMATION
BIOLOGICAL INFORMATION
INPUT INFORMATION
ENVIRONMENTAL SENSING
BIOLOGICAL SENSING
USER INPUT 50
51
AUDIO OUTPUT DEVICE
52
D/A
40
DISPLAY DEVICE UNIT
20 RECEIVING UNIT
21
BIOLOGICAL INFORMATION SENSOR
22
A/D
23
ENVIRONMENTAL INFORMATION SENSOR
24
A/D
25
INPUT DEVICE
14
CPU
11
ROM
12
RAM
13
10 CONTROLLING UNIT
30 STORAGE DEVICE UNIT
31
MATERIAL DATA STORAGE DEVICE
32
MATERIAL DATABASE
33
RESTRUCTURING RULE DATABASE
34
ALGORITHM IMPLEMENTATION PROGRAM STORAGE DEVICE

FIG. 8

| MATERIAL NUMBER | TEMPERATURE ATTRIBUTE | BODY MOTION ATTRIBUTE | TIME ATTRIBUTE | SENSIBILITY ATTRIBUTE |
|---|---|---|---|---|
| 1 | N/A | 10 OR MORE | NIGHT | QUIET |
| 2 | 25 - 30℃ | N/A | DAYTIME | CALM |
| 3 | BELOW 10℃ | BELOW 10 | EARLY MORNING | REFRESHED |
| 4 | N/A | 50 - 80 | DAYTIME | ACTIVE |
| 5 | 30℃ OR HIGHER | 80 - 100 | N/A | VIGOROUS |
| 6 | 16 - 30℃ | N/A | 11: 00 - 14: 00 | N/A |
| ... | ... | ... | ... | ... |
| N | 35℃ ± 5℃ | 0 | N/A | N/A |

APPARATUS AND METHOD OF CREATING CONTENT

TECHNICAL FIELD

The present invention relates to an apparatus and a method which use, for example, audio content data yielded by segmenting music pieces into music parts or bars as materials to generate audio content data on a new music piece (audio content).

BACKGROUND ART

Recent rise of silicon audio players and hard disk music players of portable types allows several hundreds to several tens of thousands of music pieces (music content) to be recorded in a recording medium in one playback apparatus to play back the recorded music pieces. It has been possible for users to carry preferred music pieces recorded in their own players and to listen to the recorded music pieces that are played back at any time.

Recording many music pieces in recording media to make the music pieces to be played back enables users to enjoy listening to the music for a long time. In addition, so-called shuffle playback in which the order of music pieces to be played back is changed at random allows users to listen to the music pieces in an unexpected order, so that the users are not bored with the music pieces. However, such audio players only play back the music pieces recorded in advance, and the same sound is played back every time in terms of each music piece although the number of the music pieces is increased.

Computer software, such as automatic music composition software (automatic music composition programs), is also known. With such computer software, it is sufficient for users to input situations, for example, the atmospheres of music pieces or their birthdays, in order to compose music pieces. For example, Japanese Unexamined Patent Application Publication No. 2002-117069 discloses a method of generating an appropriate music sequence (sequence of audio data) of an arbitrary length from music items (audio data to be used as materials) in a database.

Users can use such automatic music composition software through personal computers to easily and freely create original audio content and to enjoy listening to the audio content that is played back.

However, since the above automatic music composition software only generates a note for every tone or only combines materials determined in advance, it is difficult to compose high-quality music pieces (audio content) about which many audiences feel “excellent”. In addition, since it is complicated or difficult to operate the automatic music composition software invoked in personal computers, it is difficult for users unfamiliar with the personal computers to use the automatic music composition software.

Most automatic composition software uses Musical Instrument Digital Interface (MIDI) data for music composition and, therefore, there are restrictions in the automatic music composition software. For example, tones of musical instruments lack the reality or natural voices of human beings cannot be played back in the case of the automatic music composition software. Even if the reality is increased, the music pieces composed by the automatic music composition software often make no impression on users when the users know that the music pieces are not played by human beings.

Accordingly, it is an object of the present invention to provide an apparatus and a method, which are capable of using audio content data as materials in various modes to easily create a new high-quality audio content.

DISCLOSURE OF INVENTION

In order to resolve the above problems, a content creating apparatus according to the present invention includes material storage means for storing multiple pieces of audio content data used as materials and additional data storing means for storing additional data that is added to each piece of the audio content data and that functions as index/structure information. The content creating apparatus also includes at least one of receiving means for receiving external information and rule storing means for storing rule information used in a structuring process in which necessary data is extracted from the multiple pieces of the audio content data to structure a new audio content. The content creating apparatus further includes structuring means for extracting necessary audio content data from the material storage means in accordance with the additional data in the additional data storing means on the basis of at least one of the external information received by the receiving means and the rule information in the rule storing means and performing the structuring process to create a new audio content.

According to the content creating apparatus of the present invention, for example, the multiple pieces of the audio content data that are provided by segmenting the audio content data on a music piece into instrumental parts or bars and that are used as materials are prepared in advance in the material storage means. The additional data, functioning as the index/structuring information, is added to each piece of the audio content data used as the materials and is stored in the additional data storing means.

The structuring means extracts the multiple pieces of the audio content data used as materials from the material storage means in accordance with the additional data on the basis of at least one of the external information received by the receiving means and the rule information stored in the rule storing means. The structuring means uses the extracted audio content data to structure (generate) a series of audio content data for a new music piece and the generated audio content data is used.

According to the present invention, the use of the audio content data which is prepared in advance as materials in various modes allows a new high-quality music piece to be easily composed and used. In addition, a new music piece can be composed and used every time in response to a variation in, for example, the external information.

Furthermore, it is possible to vary the music piece in real time in response to an instruction from a user and to compose many music pieces even from a small number of materials. Accordingly, the way to enjoy the same recorded music pieces repeatedly, as in known CDs (compact discs), is fundamentally changed to offer a new way to enjoy music to the user.

BRIEF DESCRIPTION OF THE DRAWINGS

FIG. 8 is a table showing part of information in a restructuring rule database.

BEST MODE FOR CARRYING OUT THE INVENTION

Embodiments of apparatus and method according to the present invention will now be described with reference to the attached drawings. In the embodiments described below, a case where the apparatus and method according to the present invention is applied to an audio playback apparatus (hereinafter simply referred to as a playback apparatus) playing back audio content data, such as various music pieces, will be exemplified.

[Summary of Playback Apparatus]

Figure 1:
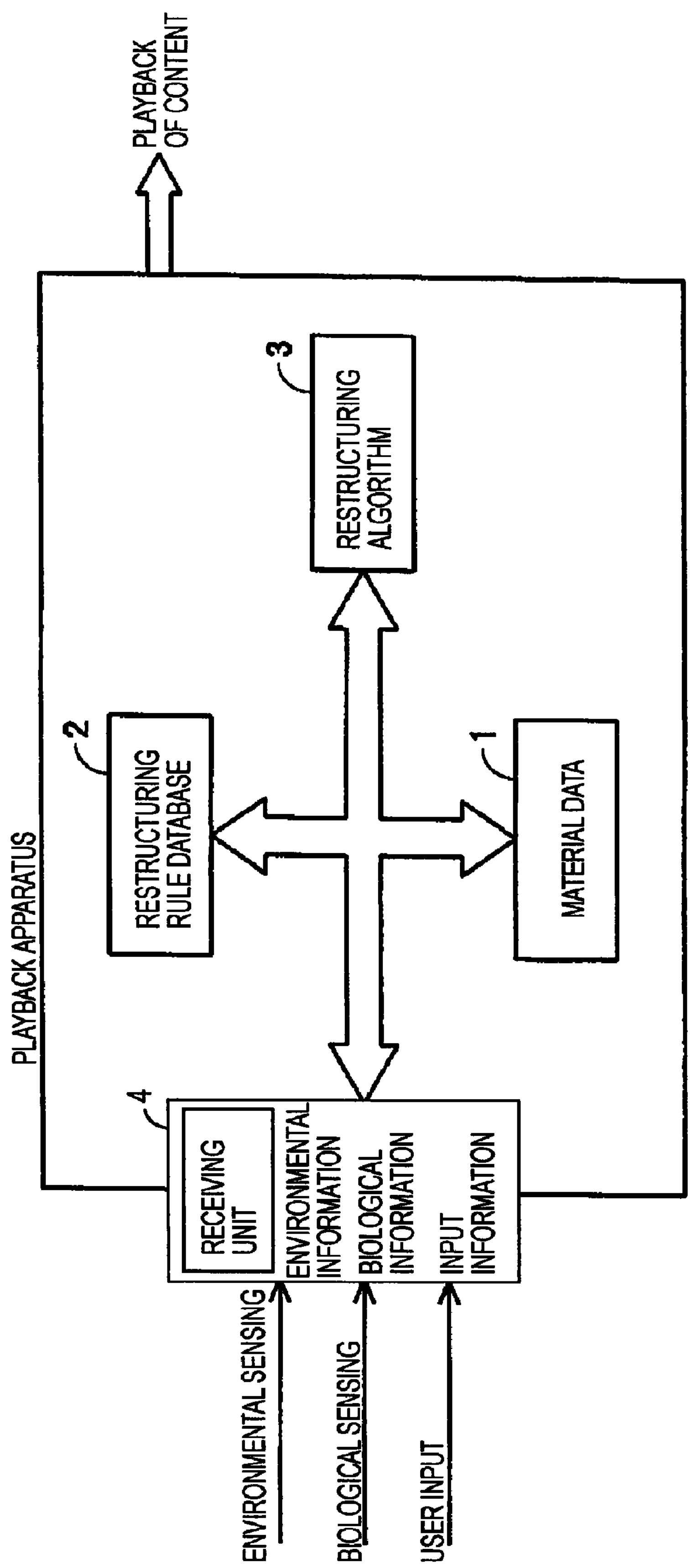
FIG. 1 is a diagram schematically showing an apparatus and a method according to the present invention.

FIG. 1 is a block diagram schematically showing a playback apparatus to which the apparatus and method according to the present invention is applied. The playback apparatus according to the embodiment is, for example, a portable audio playback apparatus. As shown in FIG. 1, the playback apparatus according to the embodiment includes many pieces of material data 1, which is audio content data used for composing (structuring) a music piece, a restructuring rule database 2, which is a database including restructuring rule information (rule information) determined in advance, and a restructuring algorithm 3, which describes a restructuring procedure determined in advance. The material data 1 is audio content data that is available in predetermined units, such as instrumental parts or bars, resulting from segmenting of a music piece.

The playback apparatus according to the embodiment also includes a receiving unit 4 that receives environmental information including temperature and humidity, biological information including the heart beat and skin temperature of a user of the playback apparatus, and external information including input operation information from the user. In playback, the playback apparatus according to the embodiment extracts necessary material data from the many pieces of material data 1 on the basis of the a variety of external information received with the receiving unit 4 and the rule information in the restructuring rule database in accordance with the restructuring algorithm 3 and restructures the extracted material data, thereby composing (restructuring) a new music piece (audio content) to play back the composed (restructured) music piece (audio content).

Specifically, the playback apparatus according to the embodiment stores many pieces of material data, which is audio content data, extracts necessary material data from the many pieces of material data, and restructures the extracted material data, thereby composing a new music piece to play back the composed music piece, instead of storing a completed music piece to simply play back the stored music piece.

[Configuration and Operation of Playback Apparatus]

Figure 2:
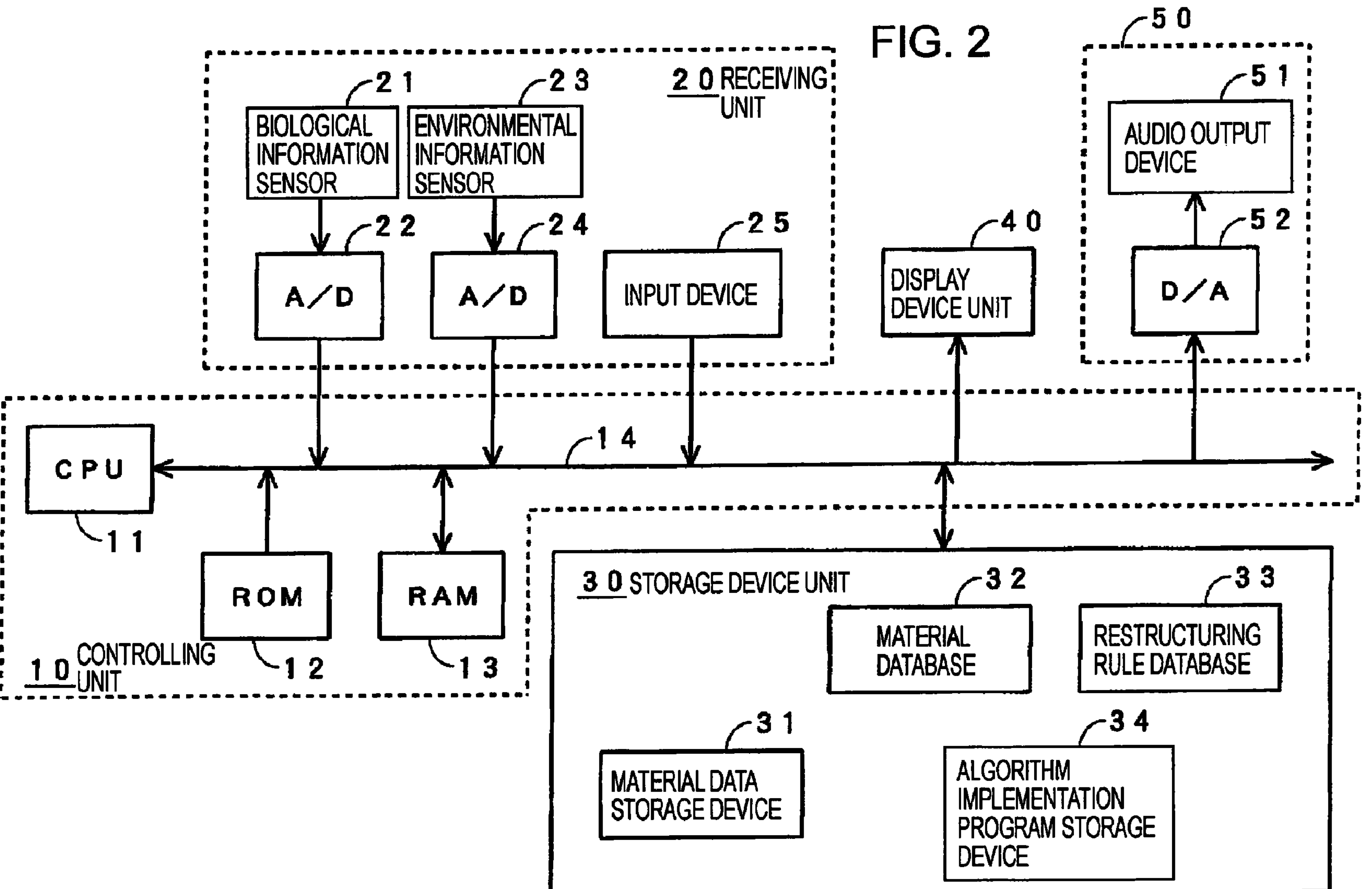
FIG. 2 is a block diagram illustrating a playback apparatus to which an embodiment of the present invention is applied.

Configuration and operation of the playback apparatus according to the embodiment will now be described. FIG. 2 is a block diagram illustrating the playback apparatus according to the embodiment. As shown in FIG. 2, the playback apparatus according to the embodiment mainly includes a controlling unit 10, a receiving unit 20, a storage device unit 30, a display device unit 40, and an output unit 50.

The controlling unit 10 is a microcomputer in which a CPU (central processing unit) 11, a ROM (random access memory) 12, and a RAM (read only memory) 13 are connected to each other via a CPU bus 14. The controlling unit 10 controls the components in the playback apparatus according to the embodiment and performs a variety of data processing, such as composition of a new music piece from material data.

The receiving unit 20 includes a biological information sensor 21, an A/D (analog-to-digital) converter 22, an environmental information sensor 23, an A/D converter 24, and an input device 25. The receiving unit 20 receives a variety of external information including biological information, sensibility information, environmental information, and input operation information and supplies the received external information to the controlling unit 10. The input device 25 is used for receiving inputs by a user and includes a key operation section called a keyboard, a pointing device such as a mouse, buttons, and a touch panel.

The storage device unit 30 includes data and programs necessary to compose a new music piece (audio content data). The storage device unit 30 in the playback apparatus according to the embodiment is, for example, a hard disk. The built-in hard disk includes a material data storage device 31, a material database storage device 32, a restructuring rule database storage device 33, an algorithm implementation program storage device 34, and so on to store a variety of information.

The display device unit 40 includes an indicating element, such as an LCD (liquid crystal display), a PDP (plasma display panel), an organic EL (organic electro-luminescence panel), or a CRT (cathode ray tube), a controller for the indicating element, and so on. Image information including a variety of message information is displayed in the display device unit 40. The output unit 50 includes an audio output device 51 and a D/A (digital-to-analog) converter 52. The output unit 50 outputs a music piece corresponding to newly generated (structured) audio content data as a sound in the playback apparatus according to the embodiment.

The material data storage device 31 in the storage device unit 30 in the playback apparatus according to the embodiment includes many pieces of audio content data, which is material data used for structuring a new music piece. The audio content data, which is material data, is generated by segmenting the audio content data on the music piece into, for example, instrumental parts or bars, as described above. The material data may be independently generated by, for example, newly recording only a predetermined instrumental part and the generated material data may be stored.

The material database storage device 32 includes identifiers and additional data associated with the identifiers. The identifiers can be used to identify the material data stored in the material data storage device 31. The additional data is added to each piece of the material data. The additional data in the material database storage device 32 is associated with the material data in the material data storage device 31 with predetermined identifiers. It is possible to identify the material data from the additional data or to identify the additional data corresponding to the material data from the material data.

The restructuring rule database storage device 33 includes restructuring rule information (rule information) and so on. The restructuring rule information indicates which material data is used and when and how the material data is used to perform the restructuring in order to compose a new music piece. The "re-" in the restructuring does not mean that "the same thing is reproduced again" but means "repetition" of the structuring of a new music piece.

The algorithm implementation program storage device 34 includes programs to be executed when a music piece is structured. The algorithms in the programs can also be used to change or adjust the time when the material data is used, the content of the material data, and the manner in which the material data is used.

Although only one storage device unit 30 is provided in the playback apparatus in FIG. 2, the material data storage device 31, the material database storage device 32, the restructuring rule database storage device 33, and the algorithm implementation program storage device 34 may be distributed in multiple storage device units (recording media). Specifically, the material data storage device 31, the material database storage device 32, the restructuring rule database storage device 33, and the algorithm implementation program storage device 34 may be provided in different storage device units (recording media), or some of them may be provided in the same storage device unit.

In the playback apparatus according to the embodiment, when an audio playback instruction is received from the user through the input device 25 connected to the controlling unit 10, the biological information received through the biological information sensor 21 and the information concerning the motion of the user are supplied to the controlling unit 10 through the A/D converter 22. The environmental information received through the environmental information sensor 23 is supplied to the controlling unit 10 through the A/D converter 24. The input information from the user, received through the input device 25, is also supplied to the controlling unit 10.

The CPU 11 in the controlling unit 10 reads out and executes the algorithm stored in the algorithm implementation program storage device 34 in the storage device unit 30 to extract necessary material data from the material data storage device 31 in accordance with the algorithm while collating the attributes of the material and the external information including the input information from the input device 25 and the input information from the biological information sensor 21 and the environmental information sensor 23 with the information in the restructuring rule database. The CPU 11 restructures the extracted material data (audio content data) on the basis of the algorithm described above and the rule information in the restructuring rule database storage device 33 to compose a new music piece.

Although also described below, multiple pieces of material data having the same additional data may be extracted through the material database storage device 32 and the extracted pieces of material data may be processed in accordance with the rule information in the restructuring rule database storage device 33 to compose a new music piece and play back the composed music piece. In other words, the playback apparatus according to the embodiment can extract the necessary material data from the multiple pieces of material data in the storage device unit 30 through the material database storage device 32 or the restructuring rule database storage device 33 and can process the extracted material data in accordance with the rule information in the restructuring rule database storage device 33 and the restructuring algorithm to compose (structure) a new music piece (audio content) and play back the composed music piece.

[Detailed Description of Additional Data]

The additional data added to the material data used in the playback apparatus according to the embodiment will now be described. The additional data representing the attributes is added to each piece of the audio content data, which is material data, in order to flexibly use the material data stored in advance in the material data storage device 31 to freely compose a new music piece.

In other words, the additional data serves as indices used for extracting target material data from the multiple pieces of material data. The additional data is stored in the material database storage device 32 in the storage device unit 30 in the playback apparatus shown in FIG. 2, and the target material data is extracted in accordance with the additional data to use the target material data for structuring of a new music piece. The additional data added to the audio content data, which is material data, will now be described in detail.

The additional data is roughly grouped into (1) musical sound information (music piece information) and time information concerning the audio content data, which is material data, (2) personal information concerning the audio content data, which is material data, (3) sensibility information, (4) environmental information, and (5) biological information. Each of the five groups of the additional data will now be described.

(1) Musical Sound Information and Time Information Concerning Audio Content Data as Material Data The additional data in (1) includes the musical sound information concerning material data and the time information associated with the musical sound information. The time information indicates how long the musical sound information is. The musical sound information concerns a musical sound (sound) yielded by playing back material data. Specifically, the musical sound information includes scale (key), chord, tempo, beats per minute (BPM), beat information (drum pattern), meter, the number of bars, volume, musical note and rest information, loop information, genre information, musical instrument information, and regional information, concerning a sound yielded by playing back the material data.

The scale (key) indicates a property of a music piece, which is determined in accordance with a C major scale or the position of the keynote of the music piece, such as C major or D major. The chord indicates the chord of a music piece, such as "C", "Am", or "Em7". When the scale or chord is varied in the middle of the audio content data, which is material data, the positional information or time information (offset information from the beginning of data) about the varied scale or chord is also included.

The tempo indicates the speed of a music piece. The BPM indicates the number of beats per minute, as described above. The beat information indicates a rhythm pattern of a drum (drum pattern) here. For 120 beats per minute, the BPM is represented as "120 BPM". The rhythm pattern includes the positional or time information (offset information from the beginning of data) where or when the attack sound of a buss drum or snare drum is input.

The meter indicates the number of beats on which a group of rhythm, such as a double meter or a triple meter, in a music piece is based. For example, the meter is represented as three-four time or four-four time. The number of bars indicates how many bars exist in the above meter. For example, the number of bars is represented as one bar or two bars.

The volume (peak or loudness) indicates the peak or intensity (level) of the loudness of a sound. The volume can be used to uniform a variation in the volume for every material data. The musical note and rest information indicates musical notes or rests in a sound yielded by playing back material data, for example, described in MML (music macro language) or described with MIDI signals. For example, the musical note and rest information is used to extract the information concerning the musical note and rest of the material data.

The loop information indicates whether the material data can be looped (loop) or is played only once (one shot). The material data that can be looped produces no noise, does not cause the tempo to be off, and does not produce an unnatural sound if the beginnings of the pieces of the material data (audio content data) are continuously joined to the ends of thereof.

The genre information is a value or character string indicating a genre, such as jazz, rock, or techno, to which the material data belongs. The musical instrument information indicates a kind of the used musical instrument, such as rhythm instrument (drum or percussion), guitar, bass guitar, or piano. Since it is not necessary to change the pitch (the pitch often must not be changed) in the case of a drum instrument or, particularly, an effect sound having no scale, it can be determined whether the material data accommodates the pitch change on the basis of the musical instrument information. The musical instrument information can also be used to determine the balance or kinds of the musical instrument in the restructuring.

The regional information indicates any region, such as Indonesia, Okinawa, or England, with which the material data is closely associated. For example, the regional information is used to identify the material data of gamelan music in Indonesia or the material data having the scale in Okinawa.

Using combination of the variety of musical sound information with the time information indicating the time duration of the musical sound information as part of the additional data allows accurate understanding of which sound the material data produces and how long the material data produces the sound, that is, of the attributes or characteristics of each material data, and appropriate processing of the material data.

(2) Personal Information Concerning Audio Content Data as Material Data

The personal information in (2) includes composer information, performer information, recorder information, and material group information. The composer information indicates the composer of a tune yielded by playing back material data. The composer information is usable, for example, when only the material data of a certain composer is collected to structure a new music piece. The composer information can be used to identify a composer with a name, a stage name, or a pen name thereof. However, the usage of the composer information is not limited to the above one. The composer information may include a variety of information concerning the composer, such as the name of a group to which the composer belongs, regional information indicating his/her hometown or the main area of his/her activity, and the age and gender of the composer.

The performer information indicates a performer who has actually performed a tune yielded by playing back material data. The performer information is usable, for example, when only the material data of a certain performer is collected to structure a music piece. The performer information can also be used to identify a performer with a name or a stage name thereof. However, the usage of the performer information is not limited to the above one. The performer information may include a variety of information concerning the performer, such as the name of a group to which the performer belongs, regional information indicating his/her hometown or the main area of his/her activity, and the age and gender of the performer.

The recorder information concerns a recording engineer who has recorded material data. The recorder information is usable, for example, when only the materials which a certain recording engineer has recorded are collected to structure a music piece. The recorder information can also be used to identify a recorder with a name or a stage name thereof. However, the usage of the recorder information is not limited to the above one. The recorder information may include a variety of information concerning the recorder, such as the name of a group to which the recorder belongs, regional information indicating his/her hometown or the main area of his/her activity, and the age and gender of the recorder.

The material group information indicates a group of material data, such as Okinawa folk song or a percussion group. The material data may be singly offered or may be offered as an archive of multiple materials. The material group information is represented by an identifier or character string used for identifying a group to which the material data belongs to. The use of the material group information allows a music piece using a certain material group to be structured.

(3) Sensibility Information

The sensibility information in (3) is added to categorize material data on the basis of the subjective sensibility of a person. The sensibility information indicates an impression, such as, "cheerful" or "sad", which the sound yielded by playing back the material data will give to audiences or indicates "suitable for a main melody", "suitable for introduction", or "suitable for background music".

The sensibility information may be represented by the categories of impressions or feelings set in advance in a system and the scores corresponding to the categories. For example, the sensibility information is represented by "cheerful: 7" or "sad: 8". Alternatively, the sensibility information may be represented by arbitrary character strings or keywords which the system or the users can interpret. With the sensibility information, it is possible to use only the material data having the sensibility information "cheerful and active" to structure a new music piece or to use only the material data having the sensibility information "sad" to structure a new music piece.

Since the above sensibility information is subjective, the sensibility information set in advance by the provider of the material data (the sensibility information set as a value or character string) could be inapplicable to a user who actually uses the material data. Accordingly, the sensibility information is made to be updated by the user who uses the material data. In other words, the sensibility information concerning the material data stored in the material database storage device 32 is made to be updated with the input device 25 in the playback apparatus. This allows the sensibility information matching with the feeling of the user to be set for the material data.

(4) Environmental Information

The environmental information in (4) concerns the environment with which material data is desirably associated. The environmental information is basically added by decision of the provider of the material data. The environmental information is also made to be updated by a user who uses the material data, as in the sensibility information described above.

In order to simplify the description of the environmental information, the environmental information is divided into several categories in the following description. The environmental information is roughly divided into five categories: climate and time information, motion information, positional information, relationship information, and other information.

The climate and time information indicates the attributes of a sound yielded by playing back material data and concerns the climate and time. Specifically, the climate and time information indicates temperature, humidity, weather, wind speed, date, hour, season, amount of snowfall, amount of rainfall, and so on. For example, when a sound yielded by playing back material data evokes an image of a "sunny night in summer", the climate and time information indicating "season: summer", "weather: fine", and "time: night" is added to the material data. When a sound yielded by playing back material data relates to a "sultry night", the climate and time information indicating "temperature: relatively high", "humidity: high", and "time: night" is added to the material data.

The motion information indicates the attributes of a sound yielded by playing back material data and concerns the movement. Specifically, the motion information indicates movement speed, acceleration, vibration, variation in force of gravity, and so on. For example, when a sound yielded by playing back the material data has a "quick rhythm with a sense of speed", the sound can be represented by setting the parameters of the movement speed and vibration to appropriate values.

The positional information indicates the attributes of a sound yielded by playing back material data and concerns the position. Specifically, the positional information indicates latitude, longitude, map information, surrounding object information, elevation, and so on. For example, use of the map information or the surrounding object information allows an attribute "near the sea" or "Shibuya-oriented" to be added to the material data.

The relationship information indicates the attributes of a sound yielded by playing back material data and concerns the person (the relationship between persons) or the organization. Specifically, the relationship information indicates a person or an organization having a certain relationship. For example, information concerning situations including "staying with a lover", "staying with the family", and "in a crowded train" can be added to the material data.

The other information includes a variety of information, such as lunar age, odor, ambient noise level, air pollution level, and ambient color, other than the above information. For example, when a sound yielded by playing back material data has an Indian melody, the environmental information of "curry" is added as the odor to the material data.

The variety of information described above may be represented by character strings or may be digitized.

(5) Biological Information

The biological information in (5) concerns biological information with which a sound yielded by playing back material data is desirably associated, as in the environmental information described above, and is added by the provider of the material data. Specifically, the biological information indicates perspiration, heart beat, pulse wave, aspiration, blinking, eye movement, gazing time, size of pupil, blood pressure, brain wave, body motion, body position, skin temperature, electrodermal resistance, microvibration (MV), myogenic potential, blood oxygen level (SPO2), and so on.

For example, when a sound yielded by playing back material data evokes an image "keeping quite", the heart beat, the pulse wave, and the aspiration are set to lower values. When a sound yielded by playing back material data evokes an image "having the racing pulse", the heart beat, the pulse wave, and the aspiration are set to higher values. Furthermore, the gazing time is increased when a sound evokes an image of "feeling of tension" or the body motion is set to a value indicating a vigorous state when a sound evokes an image of "vigorous exercise".

The biological information is made to be updated by a user who uses the material data on the basis of his/her own sense or subjectivity, as in the sensibility information and the environmental information.

As described above, in the playback apparatus according to the embodiment, (1) the musical sound information and time information concerning audio content data, which is material data, (2) the personal information concerning audio content data, which is material data, (3) the sensibility information, (4) the environmental information, and (5) the biological information are associated with the material data stored in the material data storage device 31 as the additional data, and the material data having the associated additional data is stored in the material database storage device 32.

All of the above additional data is not necessarily added to the material data. Only the additional data corresponding to the material data is added to the material data. For example, the personal information is not added to the material data if the composer, the performer, and/or the recorder are unknown. The sensibility information, the environmental information, and the biological information are not added to the material data if the information corresponding to the sensibility information, the environmental information, and the biological information does not exist.

As described above, it is possible to extract the material data necessary for structuring a new music piece on the basis of the additional data added to the material data.

[Composition (Restructuring) of New Music Piece]

Composition (restructuring) of a new music piece by using the material data in the playback apparatus according to the embodiment will now be described in various modes with reference to FIGS. 3 to 7. In composition (restructuring) of a new music piece, as described below, processes including combination of materials, change in tempo, change in pitch, change in volume, addition of an effect, change in panning, skip (extraction) of materials, and synthesis of materials are applied in accordance with the restructuring rule to structure a new music piece. The processes will now be described.

Figure 3:
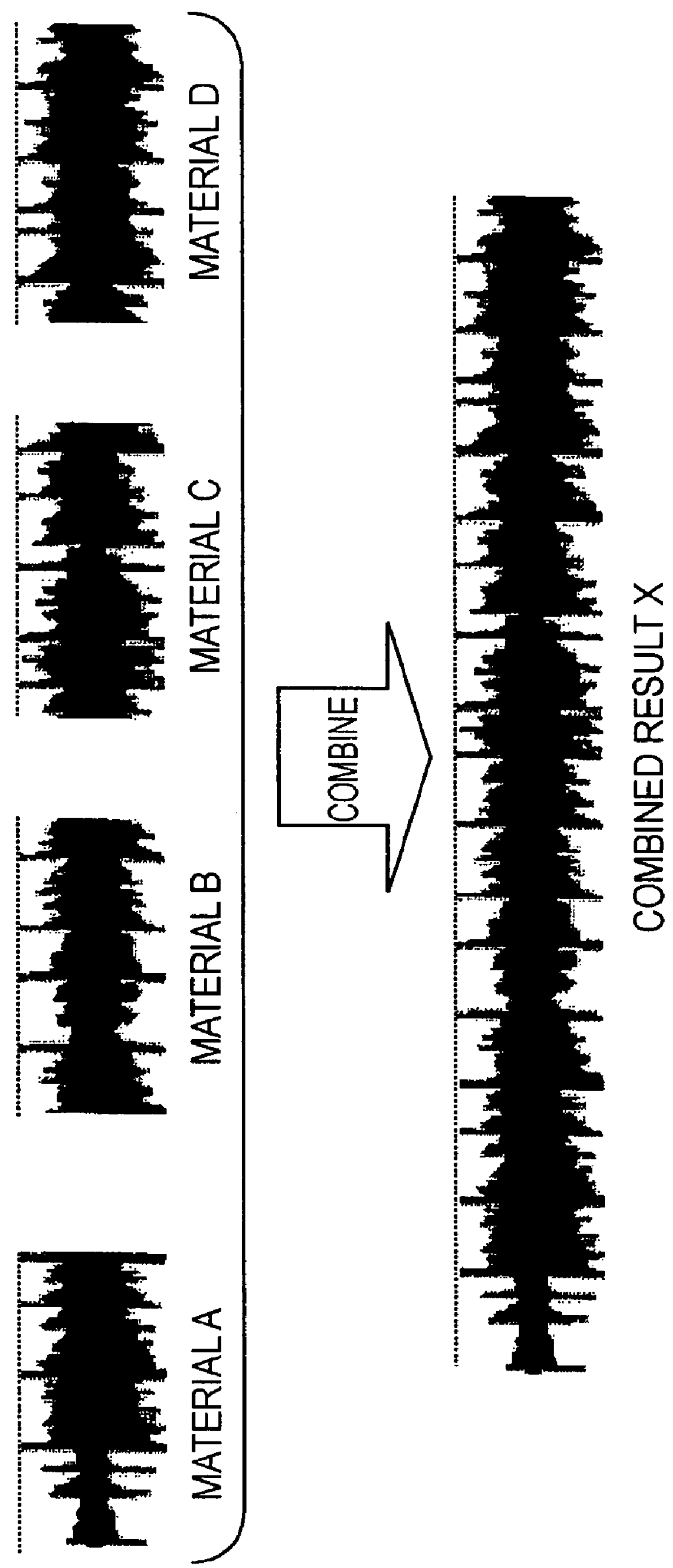
FIG. 3 includes diagrams illustrating a specific example of a restructuring process.

FIG. 3 illustrates the combination of material data. Referring to FIG. 3, the upper figures show waveforms of extracted material data A, B, C, and D, and the lower figure shows a waveform of the audio data resulting from the combination of the material data A, B, C and D. In the combination of the material data, the extracted material data A, B, C, and D is combined so as not to be overlapped with each other in the direction of time base, as shown in the upper figures in FIG. 3, to yield the continuous audio data (combined result X) shown in the lower figure in FIG. 3.

Figure 4A:
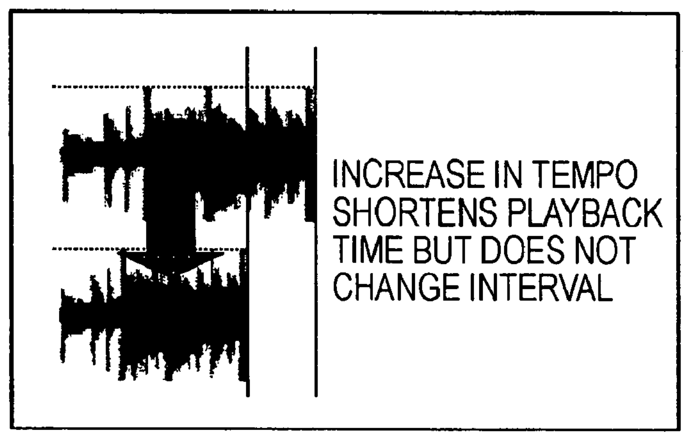
FIG. 4A illustrates a specific example of the restructuring process.

FIG. 4A illustrates the change in tempo of material data. Referring to FIG. 4A, the upper figure shows a waveform of the material data before the change in tempo and the lower figure shows a waveform of the material data after the change in tempo. The change in tempo only changes the tempo without changing the pitch. The change in tempo reduces the playback time but does not change the interval.

Figure 4B:
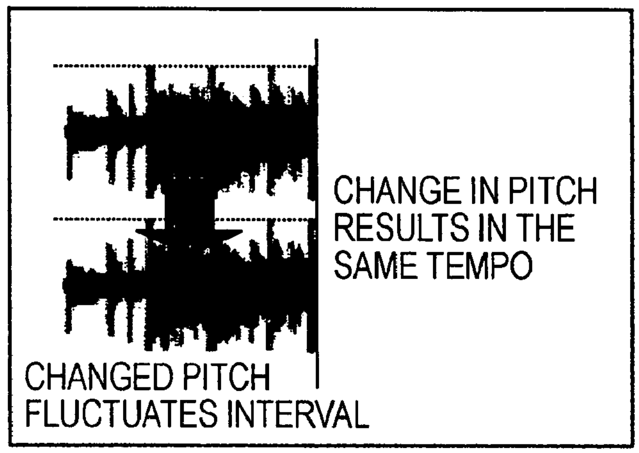
FIG. 4B illustrates another specific example of the restructuring process.

FIG. 4B illustrates the change in pitch of material data. Referring to FIG. 4B, the upper figure shows a waveform of the material data before the change in pitch and the lower figure shows a waveform of the material data after the change in pitch. The change in pitch only changes the pitch without changing the tempo. The change in pitch does not change the playback time but changes the interval.

Figure 4C:
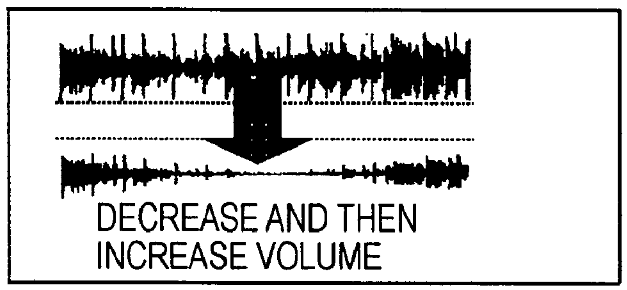
FIG. 4C illustrates another specific example of the restructuring process.

FIG. 4C illustrates the change in volume of material data. Referring to FIG. 4C, the upper figure shows a waveform of the material data before the change in volume and the lower figure shows a waveform of the material data after the change in volume. In the example shown in FIG. 4C, after the volume of the material data is gradually decreased, the volume thereof is gradually increased. Alternatively, the volume may be gradually decreased after the volume is gradually increased, the volume may be frequently fluctuated, or the volume may be fixed to a certain level.

Figure 4D:
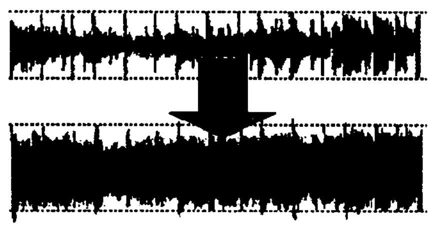
FIG. 4D illustrates another specific example of the restructuring process.

FIG. 4D illustrates the addition of an effect to material data. Referring to FIG. 4D, the upper figure shows a waveform of the material data before the addition of the effect and the lower figure shows a waveform of the material data after the addition of the effect. In the example shown in FIG. 4D, distortion is added to the material data. However, the effect process is not limited to the addition of distortion. Various effect processes including reverb, chorus, equalization, low-pass filtering (LPF), and high-pass filtering (HPF) can be added to the material data. The effect process may be applied to the entire material data or may be applied to part of the material data.

Figure 5:
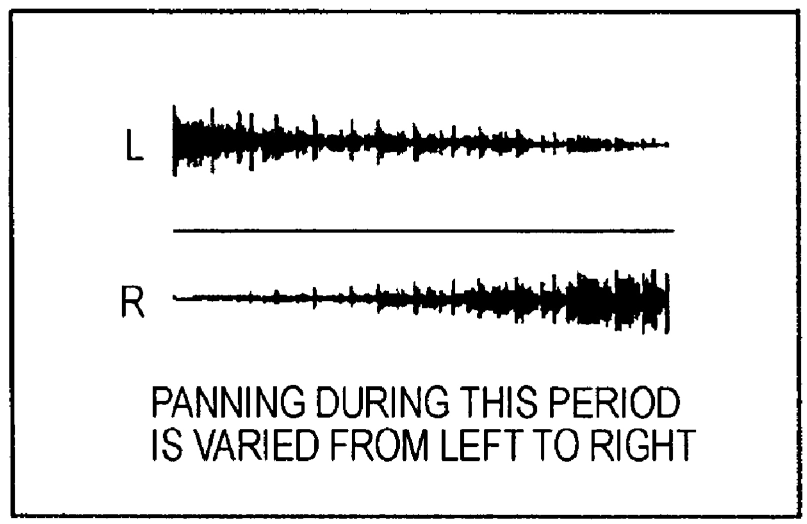
FIG. 5 illustrates a specific example of the restructuring process.

FIG. 5 illustrates the change in panning in material data. Two waveforms in FIG. 5 show waveforms of a left (L) channel and a right (R) channel generated from the same material data. The panning in the material data is changed to vary the left and right balance of a sound source.

The change in panning may also be applied to the entire material data or part of the material data. Although the two (left and right) channels are exemplified in FIG. 5, it is possible to adjust the spatial position of a sound image back and forth or up and down in a case of multiple channels, for example, four channels or 5.1 channels.

Figure 6:
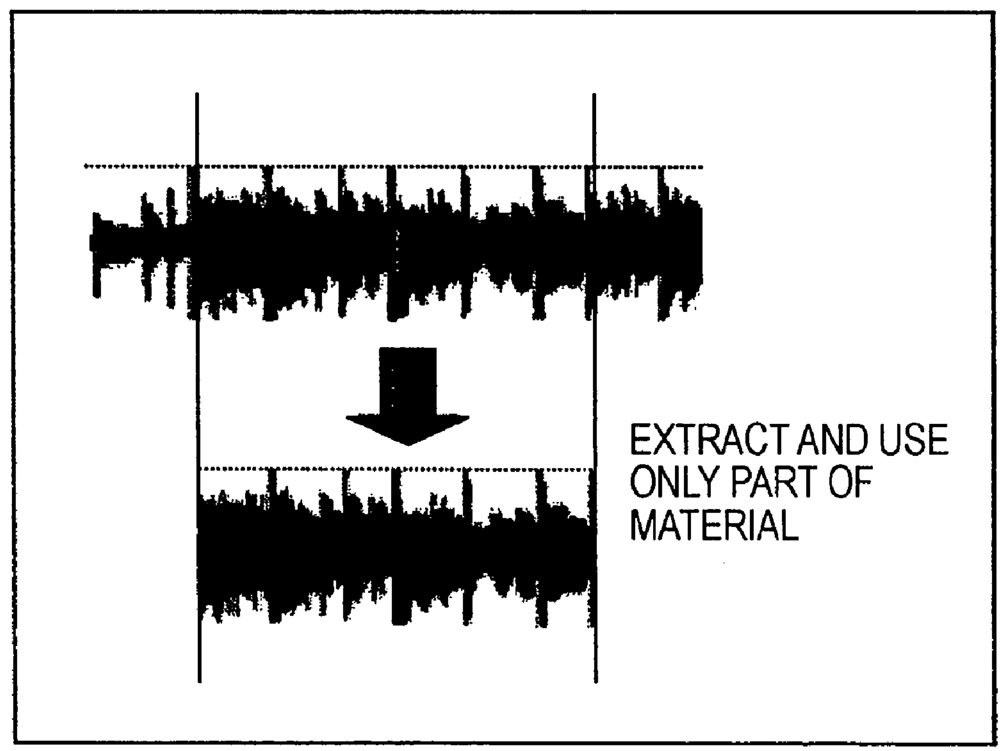
FIG. 6 illustrates a specific example of the restructuring process.

FIG. 6 illustrates the skip (extraction) of material data. Referring to FIG. 6, the upper figure shows a waveform of the material data before the skip and the lower figure shows a waveform of the material data after the skip. Specifically, in the skip of the material data, part of the material data is skipped and only necessary parts are extracted to use the material data.

Figure 7:
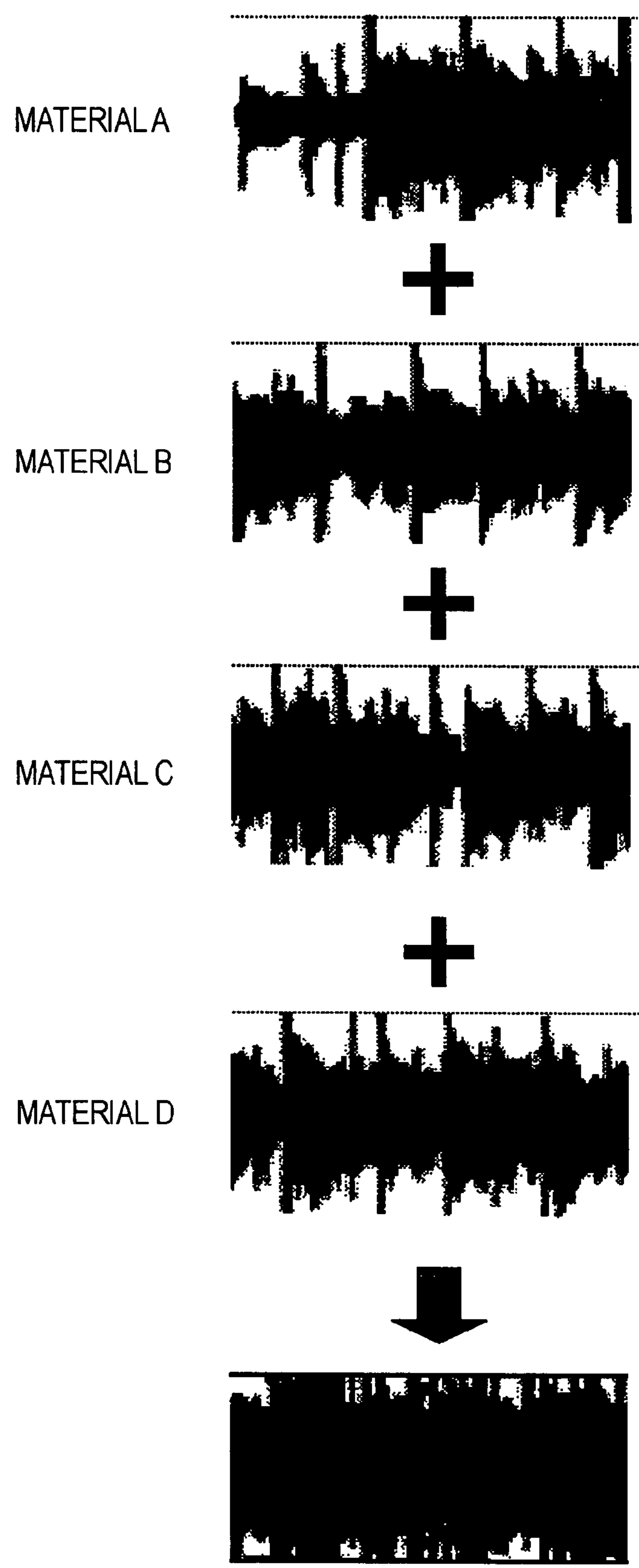
FIG. 7 includes diagrams illustrating a specific example of the restructuring process.

FIG. 7 illustrates the synthesis of material data. Referring to FIG. 6, the upper four waveforms show waveforms of material data A, B, C, and D before the synthesis. The bottom waveform in FIG. 6 shows a waveform of audio data yielded by synthesizing the material data A, B, C, and D. In the synthesis of the material data, multiple pieces of the material data are superimposed on each other on the same time base to generate new audio data. For example, it is possible to compose an ensemble by synthesizing various instrumental parts or vocal parts.

In the composition of a new music piece by using the material data, the various processes described above can be combined or two or more processes can be simultaneously applied to the material data to compose different music pieces. For example, in the case of the material data yielded by recording the tones (sounds) of instrument of five kinds, after unifying the tempo into "120", setting the chord to "G chord", and adding distortion to the guitar material, the material data is synthesized and the reverb effect is finally added to the synthesized material data. A completely new music piece can be composed from many pieces of material data.

[Content of Restructuring Rule Database]

The information stored in the restructuring rule database storage device 33 will now be described. The information in the restructuring rule database storage device 33 is referred to on the basis of the variety of external information acquired by the playback apparatus according to the embodiment with the receiving unit 20 and the additional data in the material database storage device 32 to provide information necessary for composing a new music piece.

The restructuring rule database storage device 33 includes music architecture information on which a music piece to be newly composed is based, as described below, relation information, and information indicating the content of the restructuring process, which can be selected on the basis of, for example, the external information. The relation information indicates the relationship between the external information, which is input key information in the extraction of necessary material data, and the additional data added to the material data. The external information is received through the sensors 21 and 23 and the input device 25 in the receiving unit 20 according to the embodiment, as described above.

The basic music architecture information indicates the music architecture which is the essence of a music piece to be newly composed. The music architecture information includes, for example, information about the chord progression or the tempo of the music piece. Multiple pieces of the music architecture information are provided. For example, multiple pieces of the music architecture information are provided for every genre, such as jazz, rock, pops, or ballad. The music architecture information may be selected at random by the controlling unit 10 in the playback apparatus, may be selected in accordance with an instruction input by a user with the input device 25, or may be selected on the basis of information received through the biological information sensor 21 or the environmental information sensor 23.

Of the relation information and the information indicating the content of the restructuring process, the relation information is stored in the restructuring rule database storage device 33, for example, as information shown in FIG. 8. FIG. 8 is a table showing the relation information indicating the relationship between the additional data in the restructuring rule database and the external information.

Referring to FIG. 8, material numbers indicate identifiers assigned to the multiple pieces of the material data stored in the material data storage device 31. A user can refer to the identifiers to identify target material data from the multiple pieces of material data stored in the material data storage device 31.

Referring to FIG. 8, a temperature attribute, a body motion attribute, a time attribute, and a sensibility attribute correspond to the external information used in the embodiment and the additional data added to the material data. "N/A (not applicable)" in FIG. 8 means that there is no corresponding data. Material data having the material number "1" is selected when the body motion attribute indicates "10 or more", the time attribute indicates "night", and the sensibility attribute indicates "quiet", among the attribute information yielded from the external information received through the biological information sensor 21, the environmental information sensor 23, and the input device 25.

Since there are cases where multiple pieces of the material data have the same attribute information, material data to be used may be narrowed down from the multiple pieces of the material data on the basis of other external information or the material data may be selected from other additional data in the material database storage device 32. For example, if the basic music architecture information indicates "rock", the material data in a different genre, such as Japanese folk song, is not selected on the basis of the corresponding data in the material database storage device 32.

The information indicating the content of the restructuring process indicates how each material data is processed, as described below. This information indicates the specific content of the processes including the combination, the change in tempo, the change in pitch, the change in volume, the addition of an effect, the change in panning, the skip of materials, and the synthesis of materials.

Such variety of information is stored in advance in the restructuring rule database storage device 33. The information in the restructuring rule database storage device 33 can be referred to on the basis of the above external information acquired by the playback apparatus according to the embodiment to acquire the music architecture information, to identify material data necessary for composing a new music piece, and to determine a method of processing the identified material data.

[Composition of New Music Piece]

An operation process of structuring a new music piece in the playback apparatus having the above structure, according to the embodiment, will now be described with reference to a flowchart in FIG. 9. As described above, it is assumed that the playback apparatus according to the embodiment is a portable audio playback apparatus and is used in, for example, the open air. It is also assumed that it is fine and that a user of the playback apparatus is cheerfully walking. It is further assumed that the playback apparatus according to the embodiment includes a temperature sensor and an acceleration sensor as the environmental information sensor 23.

Figure 9:
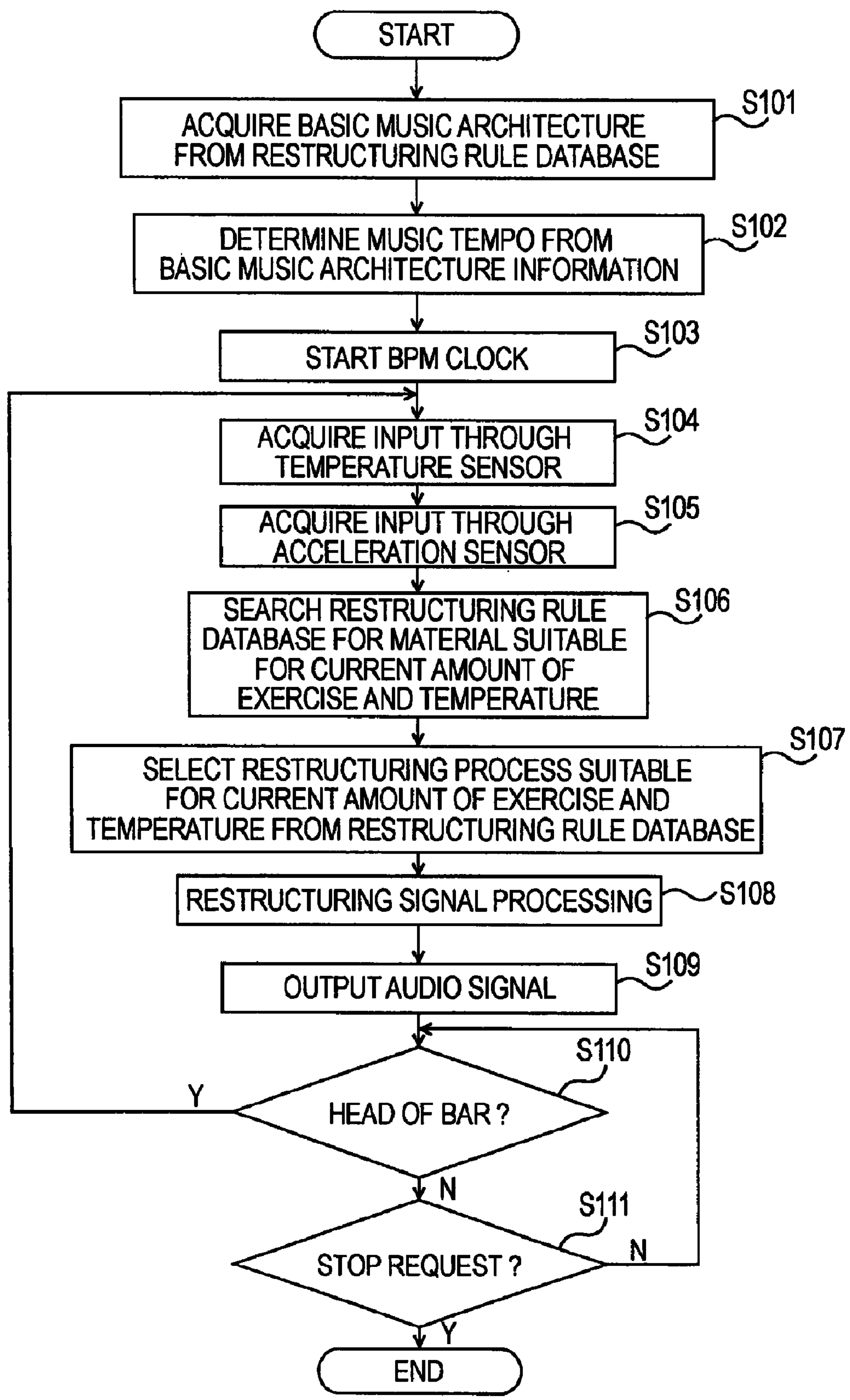
FIG. 9 is a flowchart showing the process of restructuring (composing) a new music piece, performed in the playback apparatus shown in FIG. 2.

After the user turns on the playback apparatus according to the embodiment, the controlling unit 10 in the playback apparatus performs the process shown in the flowchart in FIG. 9. The controlling unit 10 first acquires the music architecture information, which indicates the basic music architecture of a music piece to be newly composed, from the restructuring rule database storage device 33 (Step S101), and determines the tempo of the music piece to be composed (Step S102).

The music architecture information acquired in Step S101 indicates, for example, the chord progression and tempo of the music piece, as described above. The music architecture information is not limited to one piece, and recording of multiple pieces of the music architecture information increases the variation of the music piece. The music architecture information can be selected in various modes. For example, the music architecture information may be selected at random by the controlling unit 10 in the playback apparatus or may be selected on the basis of information supplied through the sensors 21 and 23 and the information input by the user with the input device 25. The user may switch between the automatic selection and the selection in accordance with an instruction from the user.

After the tempo is determined from the music architecture information, the controlling unit 10 starts a BPM (beats per minute) clock (Step S103). The BPM clock is used for counting the heads of the bars. Although not shown in FIG. 2, a clock circuit provided in the controlling unit 10 counts BPM clocks. In order to sequentially and smoothly join the pieces of the material data to each other, it is important to segment the music piece at the heads of the bars and to join the bars to each other.

Next, the controlling unit 10 acquires inputs through the sensors 21 and 23. According to the embodiment, the controlling unit 10 first acquires inputs through the temperature sensor (Step S104) and then acquires inputs through the acceleration sensor (Step S105). Of the inputs through the temperature sensor and the acceleration sensor in this example, the inputs through the acceleration sensor acquired in Step S105 are subjected to integration for several seconds or average calculation. Although the information through the temperature sensor and the acceleration sensor are used as the external information, explicit instructions by the user with the input device 25 or other switches may be acquired and considered.

The controlling unit 10 refers to the restructuring rule database storage device 33 by using the input values acquired through the sensors in Steps S104 and S105 as keys to search for and acquire the material data suitable for the current temperature and amount of exercise (Step S106). Specifically, as described above with reference to FIG. 8, the relationship between the additional information concerning the materials recorded in the material data storage device 31 and the input keys (external information) is described in the restructuring rule database storage device 33. Accordingly, the controlling unit 10 searches for the information on the basis of the external information, which is used as the input keys, to identify the material number in FIG. 8 and reads out target material data from the material data storage device 31 on the basis of the identified material number.

In the description of the relation information stored in the restructuring rule database storage device 33, the matching rule of the materials corresponding to values supplied from a certain sensor may be simply described, as shown in FIG. 8, or the material data may be divided into groups to describe state transition conditions from a certain material group to another material group.

The relationship between the restructuring process, such as the combination or synthesis described above in detail, and the input keys (external information) is also described in the restructuring rule database storage device 33. Which signal processing is applied to the material data is described in the restructuring rule database storage device 33. The controlling unit 10 acquires information indicating a process to be performed from the restructuring rule database storage device 33 (Step S107). The controlling unit 10 performs restructuring signal processing (structuring process) to the material data acquired in Step S106 on the basis of the acquired information (Step S108).

In Step S108, the controlling unit 10 does not necessarily follow only the information in the restructuring rule database storage device 33 and may use a random number element or a probability element to vary the restructuring, depending on the implemented algorithms, in order to avoid the monotony. Varying the content of the process depending on the algorithms allows a new music piece to be effectively composed. As a result, it is possible to vary a new music piece to be composed.

The restructured audio data, which has been subjected to the signal processing, is processed through the D/A converter 52 and the audio output device (speaker) 51 to output a sound corresponding to the restructured audio data from the audio output device 51 (Step S109). The restructured audio data is temporarily supplied to a sufficiently large audio buffer to be continuously played back. This is because performing the above processing at the heads of the bars can interrupt the sound at the breakpoints of the bars. While a bar is played back, the sound in the subsequent bar is prepared in the background.

The controlling unit 10 determines whether the subsequent audio data to be processed corresponds to the head of a bar (Step S110). If the controlling unit 10 determines that the subsequent audio data to be processed corresponds to the head of a bar, the controlling unit 10 goes back to Step S104 to repeat the above steps. If the controlling unit 10 determines that the subsequent audio data to be processed does not correspond to the head of a bar, the controlling unit 10 determines whether a stop request is received from the user (Step S111). If the controlling unit 10 determines that a stop request is not received, the controlling unit 10 goes back to Step S110 to repeat the above steps.

If the controlling unit 10 determines in Step S110 that a stop request is received, the controlling unit 10 terminates the process in FIG. 9 to terminate the composition of a new music piece.

As described above, the playback apparatus according to the embodiment can use multiple pieces of the material data to compose a new music piece at any time, to play back the composed music piece, and to provide the music piece to the user. The user can restructure a new music piece in accordance with the biological information, the environmental information, and the information input by the user to listen to the restructured music piece.

The user can enjoy listening to different music pieces every time. In addition, it is possible for the user to compose a music piece more suitable for the situations by varying the restructuring method in accordance with the request from the user or the state of the user. Creators can build a new business model in which various phrases are created and recorded as materials to sell the phrases, in addition to the adoption of the performance and recording method in related art in which one music piece is to be completed, thus enhancing the chance of the creators.

Music labels can establish a business in which not only flagging existing recording media but also media having materials recorded thereon are sold. Manufacturers commercializing the playback apparatus can offer new music playback apparatuses as high-value added goods of a new category to cultivate the market. In sum, the present invention can be used to bring a new culture in which users enjoys music and, thus, to energize the entire music industry.

The restructuring rule database and the restructuring algorithm may be freely determined by the installer of the apparatus. Providing only the restructuring rule database and the restructuring algorithm to users allows the output music piece to be varied, without changing the materials and the attributes thereof. Conversely, replacing the materials with others without changing the restructuring rule and algorithm also allows the output music piece to be varied. Consequently, it is possible to compose substantially unlimited numbers of combinations of music pieces by using multiple materials and multiple rule databases and algorithms.

In order to acquire the environmental information and the biological information, users may explicitly select the information from menus on operation panels or may input the information with keyboards, without using the sensors.

[Other Examples of Method of Restructuring New Content]

In the restructuring method described above with reference to FIG. 9, the restructuring rule database storage device 33 is accessed on the basis of the external information supplied through the sensors 21 and 23 and the additional data stored in the restructuring rule database storage device 33 is used to extract the material data used for restructuring new audio content. However, the restructuring method is not limited to the above one.

For example, when one or more composers are specified to create new audio content, the material data generated by the one or more specified composers may be extracted from the information in the material database storage device 32 to create new audio content by using the extracted material data. Alternatively, the material database storage device 32 may be accessed on the basis of the external information supplied through the sensors 21 and 23 or an instruction from the user, input with the input device 25, to extract necessary material data in order to create new audio content by using the extracted material data.

As described above, it is possible to use either of the restructuring rule database storage device 33 and the material database storage device 32 to create new audio content. The music architecture information is important in determining which music piece is to be newly composed. The music architecture information stored in the restructuring rule database storage device 32 may be used or the music architecture information corresponding to the instruction from the user, input with the input device 25, may be used.

Although the music architecture information and the information in which the material number, the additional data to be used, and the information indicating the content of the restructuring process are associated with each other are stored in the restructuring rule database storage device 33 in the above embodiment, the music architecture information and the other information may be stored in different recording media.

As described above, in the playback apparatus according to the embodiment, a music piece is restructured in playback on the basis of the material data and the additional data concerning the material in the recording medium in which music materials are recorded in a PCM (pulse code modulation) or compressed audio format. Accordingly, it is possible to compose different music pieces each time the material data is played back even if the same materials are used.

Since the material data corresponding to a phrase actually performed by a performer is used as one unit, unlike automatic composition with MIDI data, it is possible for a user to feel the actual performance by the performer. In addition, since each phrase is not automatically composed and phrases about which the performer or composer feels "good" are recorded, it is possible to overcome the limitations that "the phrases are not strange as music but are not good", unlike the automatic composition software. In other words, the personalities of the composer and performer can be kept.

Recording and playing back the recording materials with the information that can be restructured allows a flexible and high-quality music piece to be automatically restructured.

[Others]

The audio content data, which is material data, may be linear PCM data or may be compressed audio data compressed in various formats. The material data includes the entity of the audio data, such as the linear PCM data or compressed audio data, and the additional data necessary for the restructuring.

As described above, the material data may be subjected to addition, change, deletion, partial replacement, complete replacement, and the like independently of the restructuring database.

Although the hard disk is used as the recording medium in the above embodiment, the recording medium is not limited to the hard disk. Disk recording media of various types, such as an optical disk, magneto-optical disk, and magnetic disk, or various recoding media including a semiconductor memory may be used. In this case, the material data may be recorded in a recording medium different from that of the restructuring rule database.

Although the portable playback apparatus is described in the above embodiment, the playback apparatus is not limited to a portable type. The playback apparatus according to the embodiment is applicable to a desktop playback apparatus installed and used in, for example, household.

If the process described above with reference to FIG. 9 is programmed, the playback apparatus according to the embodiment is embodied by a personal computer that can execute the program. The method according to the present invention can be realized in the personal computer.

Although new audio content is created and played back in real time in the playback apparatus according to the embodiment, the creation and playback of new audio content is not limited to the above manner. For example, new audio content may be created in advance and the created audio content may be recorded in a recording medium to play back the newly created audio content, which is recorded in the recording medium.

Although the controlling unit 10 performs the restructuring process using the necessary material data by using the restructuring algorithm and the restructuring rule database in the above embodiment, the restructuring process is not limited to the above one. A DSP (digital signal processor) for audio content data may be used to restructure new audio content.

As described above, since the available biological information includes perspiration, heart beat, pulse wave, aspiration, blinking, eye movement, gazing time, size of pupil, blood pressure, brain wave, body motion, body position, skin temperature, electrodermal resistance, microvibration, myogenic potential, blood oxygen level, and so on, provision of sensors that can detect the above information increases the cost. Accordingly, only part of the biological information may be detected to use the detected biological information. For example, only the temperature sensor and the pulse wave sensor may be used.

Similarly, since the available environmental information includes temperature, humidity, weather, wind speed, date, hour, season, lightness, odor, elevation, amount of snowfall, amount of rainfall, ambient noise level, air pollution level, latitude, longitude, map information, ambient color, surrounding object information, movement speed, acceleration, lunar age, variation in force of gravity, vibration, relationship information, and so on, the use of all of the above information can undesirably increase the cost. Accordingly, as in the playback apparatus according to the above embodiment, for example, only the temperature sensor and the acceleration sensor may be provided to yield the available environmental information.

Furthermore, if the user inputs information concerning the audio content automatically created (restructured) in the above manner with the input device 25 to modify or update the information in the restructuring rule database or if the generated audio content data is made to be arranged manually, it is possible to more flexibly create new audio content in accordance with the user's own taste.

The invention claimed is:

1. A content creating apparatus comprising:

material storage means for storing multiple pieces of music content data used as materials; and additional data storing means for storing additional data that is added to each piece of the music content data and that functions as at least one of index and structure information, the content creating apparatus also comprising at least one of receiving means for receiving external information; and rule storing means for storing rule information used in a structuring process in which necessary data is extracted from the multiple pieces of the music content data to structure a new music content, the content creating apparatus further comprising structuring means for extracting necessary music content data from the material storage means in accordance with the additional data in the additional data storing means based on at least one of the external information received by the receiving means and the rule information in the rule storing means and performing the structuring process to create the new music content by superimposing at least two different pieces of the music content data on the same time base.

2. The content creating apparatus according to claim 1, wherein the additional data storing means stores the additional data including at least one of tempo, scale, chord, meter, the number of bars, volume, musical note and rest sequence, loop information, genre information, kind of musical instrument, regional information, composer information, performer information, recorder information, material group information, sensibility information, biological information, and environmental information.

3. The content creating apparatus according to claim 2, wherein the additional data storing means stores information described by a numerical value and/or character string representing a feeling, emotion, or sentiment of a person as the sensibility information included in the additional data.

4. The content creating apparatus according to claim 2, wherein the additional data storing means stores at least one of perspiration, heart beat, pulse wave, aspiration, blinking, eye movement, gazing time, size of pupil, blood pressure, brain wave, body motion, body position, skin temperature, electrodermal resistance, microvibration, myogenic potential, and blood oxygen level as the biological information included in the additional data.

5. The content creating apparatus according to claim 2, wherein the additional data storing means stores at least one of temperature, humidity, weather, wind speed, date, hour, season, lightness, odor, elevation, amount of snowfall, amount of rainfall, ambient noise level, air pollution level, latitude, longitude, map information, ambient color, surrounding object information, movement speed, acceleration, lunar age, variation in force of gravity, vibration, and relationship information as the environmental information included in the additional data.

6. The content creating apparatus according to claim 2, further comprising:

change instruction receiving means for receiving a change instruction concerning at least one of the genre information, the biological information, the sensibility information, and the environmental information included in the additional data, wherein the content creating apparatus arbitrarily changes at least one of the genre information, the biological information, the sensibility information, and the environmental information.

7. The content creating apparatus according to claim 1, wherein the content creating apparatus includes, as the receiving means, at least one of biological information detecting and receiving means, environmental information detecting and receiving means, instruction receiving means for receiving an instruction from a user, and sensibility information receiving means for receiving the sensibility information.

8. The content creating apparatus according to claim 7, wherein the biological information detecting and receiving means detects and receives at least one of perspiration, heart beat, pulse wave, aspiration, blinking, eye movement, gazing time, size of pupil, blood pressure, brain wave, body motion, body position, skin temperature, electrodermal resistance, microvibration, myogenic potential, and blood oxygen level.

9. The content creating apparatus according to claim 7, wherein the sensibility information received by the sensibility information receiving means is described by a numerical value and/or character string representing a feeling, emotion, or sentiment of a person.

10. The content creating apparatus according to claim 7, wherein the environmental information detecting and receiving means detects and receives at least one of temperature, humidity, weather, wind speed, date, hour, season, lightness, odor, elevation, amount of snowfall, amount of rainfall, ambient noise level, air pollution level, latitude, longitude, map information, ambient color, surrounding object information, movement speed, acceleration, lunar age, variation in force of gravity, vibration, and information concerning the relationship with persons nearby.

11. The content creating apparatus according to claim 1, wherein the structuring means performs at least one of sorting, synthesis, change in pitch, change in tempo, change in volume, and change in tone quality to the music content data used as the materials.

12. The content creating apparatus according to claim 1, wherein the rule storing means stores the rule information, which uses at least one of music architecture information, the additional data added to the materials, and the external information received by the receiving means to determine the content of the structuring process.

13. The content creating apparatus according to claim 1, further comprising:

playback means for playing back in real time the music content created by the structuring means in accordance with the structuring process for the music content, performed by the structuring means.

14. The content creating apparatus according to claim 1, further comprising:

created content storing means for storing the music content created by the structuring means; and playback means for playing back the music content stored in the created content storing means.

15. A content creating method comprising the steps of:

storing multiple pieces of music content data used as materials and additional data that is added to each piece of the music content data and that functions as at least one of index and structure information; and extracting necessary music content data from the multiple pieces of the music content data in accordance with the stored additional data based on at least one of external information externally received and rule information used in a structuring process, in which necessary data is extracted from the multiple pieces of the music content data to structure a new music content, and performing the structuring process to create the new music content by superimposing at least two pieces of the music content data on the same time base.

16. The content creating method according to claim 15, wherein the additional data includes at least one of tempo, scale, chord, meter, the number of bars, volume, musical note and rest sequence, loop information, genre information, kind of musical instrument, regional information, composer information, performer information, recorder information, material group information, sensibility information, biological information, and environmental information.

17. The content creating method according to claim 16, wherein the sensibility information included in the additional data is described by a numerical value and/or character string representing a feeling, emotion, or sentiment of a person.

18. The content creating method according to claim 16, wherein the biological information included in the additional data includes at least one of perspiration, heart beat, pulse wave, aspiration, blinking, eye movement, gazing time, size of pupil, blood pressure, brain wave, body motion, body position, skin temperature, electrodermal resistance, microvibration, myogenic potential, and blood oxygen level.

19. The content creating method according to claim 16, wherein the environmental information included in the additional data includes at least one of temperature, humidity, weather, wind speed, date, hour, season, lightness, odor, elevation, amount of snowfall, amount of rainfall, ambient noise level, air pollution level, latitude, longitude, map information, ambient color, surrounding object information, movement speed, acceleration, lunar age, variation in force of gravity, vibration, and relationship information.

20. The content creating method according to claim 16, further comprising the step of:

receiving a change instruction concerning at least one of the genre information, the biological information, the sensibility information, and the environmental information included in the additional data, wherein at least one of the genre information, the biological information, the sensibility information, and the environmental information is arbitrarily changed.

21. The content creating method according to claim 16, wherein the external information includes at least one of the biological information, the environmental information, the sensibility information, and information concerning an instruction from a user.

22. The content creating method according to claim 21, wherein the biological information includes at least one of perspiration, heart beat, pulse wave, aspiration, blinking, eye movement, gazing time, size of pupil, blood pressure, brain wave, body motion, body position, skin temperature, electrodermal resistance, microvibration, myogenic potential, and blood oxygen level.

23. The content creating method according to claim 21, wherein the sensibility information is described by a numerical value and/or character string representing a feeling, emotion, or sentiment of a person.

24. The content creating method according to claim 21, wherein the environmental information includes at least one of temperature, humidity, weather, wind speed, date, hour, season, lightness, odor, elevation, amount of snowfall, amount of rainfall, ambient noise level, air pollution level, latitude, longitude, map information, ambient color, surrounding object information, movement speed, acceleration, lunar age, variation in force of gravity, vibration, and information concerning the relationship with persons nearby.

25. The content creating method according to claim 15, wherein at least one of sorting, synthesis, change in pitch, change in tempo, change in volume, and change in tone quality is performed to the music content data used as the materials in the structuring process.

26. The content creating method according to claim 15, wherein the rule information uses at least one of music architecture information, the additional data added to the materials, and the external information to instruct the content of the structuring process.

27. The content creating method according to claim 15, further comprising the step of:

playing back in real time the music content that is subjected to the structuring process and that is newly created.

28. The content creating method according to claim 15, further comprising the steps of:

storing the music content that is subjected to the structuring process and that is newly created in a memory; and playing back the music content stored in the memory.

* * * * *